US010649271B2

(12) United States Patent
Nam et al.

(10) Patent No.: US 10,649,271 B2
(45) Date of Patent: May 12, 2020

(54) POLARIZING PLATE

(71) Applicant: LG CHEM, LTD., Seoul (KR)

(72) Inventors: Sung Hyun Nam, Daejeon (KR); Kyung Ki Hong, Daejeon (KR); Yeong Rae Chang, Daejeon (KR); Heon Kim, Daejeon (KR); Kyun Il Rah, Daejeon (KR); Jong Hyun Jung, Daejeon (KR); Byung Sun Lee, Daejeon (KR); Eung Jin Jang, Daejeon (KR); Jin Yong Park, Daejeon (KR); Deok Woo Park, Daejeon (KR); Ji Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/071,704

(22) PCT Filed: Feb. 3, 2017

(86) PCT No.: PCT/KR2017/001232
§ 371 (c)(1),
(2) Date: Jul. 20, 2018

(87) PCT Pub. No.: WO2017/135765
PCT Pub. Date: Aug. 10, 2017

(65) Prior Publication Data
US 2019/0025642 A1 Jan. 24, 2019

(30) Foreign Application Priority Data

Feb. 3, 2016 (KR) .................. 10-2016-0013473
Feb. 3, 2017 (KR) .................. 10-2017-0015578

(51) Int. Cl.
*G02F 1/1335* (2006.01)
*G02B 5/30* (2006.01)

(52) U.S. Cl.
CPC ..... *G02F 1/133528* (2013.01); *G02B 5/3025* (2013.01); *G02B 5/3033* (2013.01); *G02F 1/133536* (2013.01); *G02F 1/133553* (2013.01)

(58) Field of Classification Search
CPC .................................. G02F 1/133528
See application file for complete search history.

(56) References Cited

U.S. PATENT DOCUMENTS

| 9,726,798 | B2 | 8/2017 | Takasago et al. | |
|---|---|---|---|---|
| 9,915,759 | B2 | 3/2018 | Park et al. | |
| 2003/0170478 | A1* | 9/2003 | Cael | B32B 7/00 428/515 |
| 2004/0004777 | A1* | 1/2004 | Takehisa | G02B 5/0808 359/883 |
| 2010/0226008 | A1* | 9/2010 | Higeta | C07D 249/22 359/487.02 |
| 2012/0249942 | A1* | 10/2012 | Yoshihara | G02B 1/111 349/137 |
| 2014/0204460 | A1* | 7/2014 | Nam | G02B 5/3083 359/489.07 |
| 2014/0354924 | A1* | 12/2014 | Byun | G02F 1/133514 349/106 |
| 2015/0369965 | A1 | 12/2015 | Kishi et al. | |

FOREIGN PATENT DOCUMENTS

| CN | 104950371 | 9/2015 |
|---|---|---|
| CN | 104956241 | 9/2015 |
| CN | 105278148 | 1/2016 |
| EP | 2426523 A2 | 3/2012 |
| EP | 2728388 A1 | 5/2014 |
| JP | 2004021145 | 1/2004 |
| JP | 3870632 B2 | 1/2007 |
| KR | 10-2005-0007192 A | 1/2005 |
| KR | 10-2011-0104700 A | 9/2011 |
| KR | 10-2015-0004015 A | 1/2015 |
| KR | 1020150004015 A | 1/2015 |
| KR | 10-2015-0109852 A | 10/2015 |
| KR | 10-2016-0094339 A | 8/2016 |
| KR | 10-2016-0094878 A | 8/2016 |

* cited by examiner

Primary Examiner — Edmond C Lau
(74) Attorney, Agent, or Firm — Dentons US LLP

(57) ABSTRACT

The present application relates to a polarizing plate and a display device. In the present application, a polarizing plate can be provided, which can be applied to a display device comprising a highly reflective panel to solve disadvantages while maintaining advantages of the device. In the present application, a display device comprising the polarizing plate and the highly reflective panel can also be provided.

15 Claims, No Drawings

POLARIZING PLATE

TECHNICAL FIELD

This application is a National Stage Entry of International Application No. PCT/KR2017/001232 filed on Feb. 3, 2017, and claims the benefit of Korean Application No. 10-2016-0013473 filed on Feb. 3, 2016 and Korean Patent Application No. 10-2017-0015578 filed on Feb. 3, 2017, all of which are hereby incorporated by reference in their entirety for all purposes as if fully set forth herein.

The present application relates to a polarizing plate.

BACKGROUND ART

An LCD (liquid crystal display) is a display device using light transmittance varying according to arrangement of liquid crystals, which may display desired colors and images by controlling transmission of light emitted from a backlight according to a voltage applied to liquid crystals and passing it through a color filter.

In a typical LCD, liquid crystals are present between a lower substrate on which a TFT (thin film transistor) is formed and an upper substrate on which a color filter and a BM (black matrix) are formed. Here, the lower substrate is a substrate located closer to the backlight side than the two substrates included in the LCD, and the upper substrate is a substrate present on the viewing side.

In such a general LCD, a reflectance measured at the upper substrate side is generally about 10% at a wavelength of 550 nm.

Recently, an LCD comprising a structure in which the color filter and the BM are present together with the TFT on the lower substrate other than the upper substrate, or in which the BM is absent and the color filter exists together with the TFT on the lower substrate is being developed. Such an LCD has no BM or the like on the upper substrate side, and thus has excellent luminance characteristics. However, since the BM or the like is not present on the upper substrate, the reflectance of external light due to the reflection by an electrode or the like rises, so that a problem that a visual sense, particularly, a visual sense in a black state, of the display is distorted arises.

DISCLOSURE

Technical Problem

The present application provides a polarizing plate.

Technical Solution

The present application relates to a polarizing plate. In this specification, the term polarizing plate may mean a polarizer, that is, a functional element itself exhibiting a polarization function such as a PVA (poly(vinyl alcohol)-based film, or may mean an element comprising the polarizer and other components. Here, the other components included in the polarizing plate together with the polarizer may be exemplified by a polarizer protective film, an optical retardation film, an adhesive layer, a pressure-sensitive adhesive layer or a low-reflection layer, and the like, but is not limited thereto.

The polarizing plate of the present application is a polarizing plate for a highly reflective panel, that is, a polarizing plate applied to a highly reflective panel. In the present application, the term highly reflective panel may mean a display panel having a reflectance (based on a wavelength of 550 nm) of 11% or more, 12% or more, 14% or more, 16% or more, 18% or more, 20% or more, 21% or more, or 22% or more. The reflectance (based on a wavelength of 550 nm) of the highly reflective liquid crystal panel may be, for example, 30% or less, 28% or less, 26% or less, 24% or less, 22% or less, or 20% or less. The highly reflective panel may be a transmissive panel. That is, the highly reflective panel is a panel exhibiting a high reflectance by a unique structure as described below, which may not be a panel in which the reflectance is increased by separately introducing a reflective plate or the like, such as known semi-transmissive reflective liquid crystal panels or reflective liquid crystal panels. Thus, in one example, the highly reflective panel may not comprise a reflective plate.

The reflectance may be a viewing side reflectance. The viewing side reflectance may be a reflectance measured in a direction in which an observer observes the display panel in a state where the panel is used.

In the present application, the term upper substrate means, in a liquid crystal panel structure comprising liquid crystals interposed between two substrates, a substrate closer to an observer observing an image displayed by the liquid crystal panel among the two substrates.

For example, such an upper substrate may mean a substrate opposite to a backlight side substrate in a transmissive liquid crystal panel, specifically, a substrate farther from the backlight than the lower substrate among the upper and lower substrates, which are two substrates, and the lower substrate may mean a substrate closer to the backlight than the upper substrate.

A general liquid crystal panel comprises liquid crystals interposed between an upper substrate and a lower substrate. Here, a TFT (thin film transistor) capable of applying an electrical signal is present on the lower substrate, a color filter is present on the upper substrate, and the color filter comprises a so-called BM (black matrix). In general liquid crystal panels, since the color filter comprising the BM for blocking or absorbing light is present on the upper substrate as above, the reflectance usually shows about 10% (based on a wavelength of 550 nm).

The highly reflective liquid crystal panel has, for example, a structure that comprises no BM, a structure in which the color filter and the BM do not exist in the upper substrate but exist in the lower substrate or a structure in which the color filter comprising no BM is present on the lower substrate, and the like. In one example, the highly reflective liquid crystal panel may be a panel in which a color filter and a TFT are disposed together on a lower substrate, and in such a case, the color filter may or may not comprise the BM. The elevated reflectance of the highly reflective liquid crystal panel may affect a color sense, especially a color sense of the black state, of the display device. The term black state herein is a state in which the liquid crystal panel is adjusted so as to block light from a light source, which may mean, for example, a state of off-voltage in a normally black mode or a state of on-voltage in a normally white mode. Furthermore, in the case of a panel comprising no BM among the highly reflective liquid crystal panels, a larger light leakage due to an increase in an aperture ratio or the like in the black state may be caused, and such a light leakage may bring the color sense in the black state close to approximately red or yellow. The polarizer or polarizing plate of the present application has optical characteristics to be described below, and such optical characteristics can maximize the advantages while solving the problems that may occur in the highly reflective liquid crystal panel as above.

Accordingly, the highly reflective liquid crystal panel to which the polarizer of the present application is applied may be a liquid crystal panel comprising no BM, or a liquid crystal panel that a color filter does not exist on the upper substrate and exists together with a TFT on the lower substrate. The liquid crystal panel comprising no BM may or may not comprise a color filter, and in the case of comprising the color filter, this color filter may exist on the lower substrate instead of the upper substrate. In addition, in the structure in which the color filter and the TFT are simultaneously present on the lower substrate, the color filter may or may not comprise a BM. A liquid crystal panel having such a structure, for example, a liquid crystal panel in which a color filter exists on a lower substrate may be advantageous in realizing various structures such as a curved surface structure, and may be advantageous in terms of luminance when no BM is present.

Such a polarizer may be an upper polarizer of the liquid crystal panel. In the present application, the term upper may mean a direction facing an observer who observes images from a display device when the display device implements the images and the term lower may mean the opposite direction. The upper polarizer may also be referred to as a viewing side polarizer in another term. Furthermore, in the present application, the term lower polarizer may also be referred to as a back side polarizer or a light source side polarizer.

The polarizing plate of the present application may be one which satisfies Equation 1 below or satisfies Equation 2 below.

$$0.9 \leq K1 = R1(450)/R1(650) + 0.044 \times \exp(0.43 \times bs) \leq 1.1 \quad \text{[Equation 1]}$$

In Equation 1, bs means a single color (bs) of the polarizing plate. In the present application, the term single color (bs) means a b value in CIE Lab color space (b value in condition 2 to be described below).

In Equation 1, R1 (450) is a reflectance (unit:%) of the polarizing plate for light having a wavelength of 450 nm measured under a state where the polarizing plate is positioned on a reflective surface having a reflectance of about 23% for light having a wavelength of 550 nm, and R1 (650) is a reflectance (unit:%) of the polarizing plate for light having a wavelength of 650 nm measured under a state where the polarizing plate is positioned on a reflective surface having a reflectance of about 23% for light having a wavelength of 550 nm.

In Equation 1, exp is an abbreviation of exponential function.

$$0.9 \leq K2 = R2(450)/R2(650) + 0.0026 \times \exp(1.09 \times bs) \leq 1.1 \quad \text{[Equation 2]}$$

In Equation 2, bs means a single color (bs) as in Equation 1 of the polarizing plate.

In Equation 2, R2 (450) is a reflectance (unit:%) of the polarizing plate for light having a wavelength of 450 nm measured under a state where the polarizing plate is positioned on a reflective surface having a reflectance of about 15% for light having a wavelength of 550 nm, and R2 (650) is a reflectance (unit: %) of the polarizing plate for light having a wavelength of 650 nm measured under a state where the polarizing plate is positioned on a reflective surface having a reflectance of about 15% for light having a wavelength of 550 nm.

In Equation 2, exp is an abbreviation of exponential function.

In Equations 1 and 2, R1 (450)/R1 (650) or R2 (450)/R2 (650) is a ratio of a reflectance at a wavelength of 450 nm representing a short wavelength in the visible light region and a reflectance at a wavelength of 650 nm also representing a long wavelength in the visible light region, which can be defined as neutrality of wavelength dispersion for reflection. The inventors have confirmed that a polarizing plate in which the neutrality of wavelength dispersion for reflection and single color satisfy any one of Equations 1 and 2 above can solve the problem of color sense distortion caused by reflected light generated in a highly reflective panel, and can solve the visibility degradation by reflected light.

The inventors have proposed a polarizing plate useful in a highly reflective liquid crystal panel having a reflectance for light having a wavelength of 550 nm in a level of about 18% to 19% as a highly reflective liquid crystal panel, in Korean Patent Application No. 10-2016-0012170 and Korean Patent Application No. 10-2016-0012172. However, as a result of further studies, it has been confirmed that the polarizing plate proposed in the above patents has insignificant performance in, as a liquid crystal panel having a reflectance higher than that of a general liquid crystal panel, but a reflectance lower than the level of about 18% to 19% which is a reflectance proposed in the above patents, for example, a liquid crystal panel having a reflectance for light having a wavelength of 550 nm of less than about 18%, about 17% or less, about 16% or less, about 15% or less, about 14% or less, about 13% or less, or about 12.5% or less, or as a liquid crystal panel having a reflectance higher that the reflectance proposed in the above patents, for example, a liquid crystal panel having a reflectance for light having a wavelength of 550 nm of about 20% or more, about 21% or more, or about 22% or more. However, the polarizing plate proposed in the present application can exhibit an excellent effect even in the highly reflective panel as above. The upper or lower limit of the reflectance of each panel is as described above.

Specific methods of measuring the single color (bs), R (450) and R (650) applied to Equation 1 or 2 are described in the following examples.

In another example, K1 in Equation 1 may be 0.95 or more, or 0.97 or more. In another example, the K1 may be 1.05 or less, or 1.03 or less. In a suitable example, K1 may have a value close to 1, or be 1.

In another example, K2 in Equation 1 may be 0.95 or more, or 0.97 or more. In another example, the K2 may be 1.05 or less, or 1.03 or less. In a suitable example, K2 may have a value close to 1, or be 1.

The polarizing plate having the relationship as above can block or absorb light having a long wavelength, for example, red to yellow series light, among the light from the highly reflective panel, for example, the highly reflective liquid crystal panel, thereby improving visual sense characteristic in the black state and solving the problem of visibility degradation due to reflected light or the like.

In one example, the polarizing plate satisfying Equation 1 or 2 above may have a single transmittance (Ts), that is, a transmittance (Ts) for un-polarized light in a range of about 40% to about 45%. In another example, the transmittance (Ts) may be about 44% or less, about 43% or less, about 42% or less, or about 41% or less. When the single transmittance (Ts) of the polarizing plate satisfying Equation 1 or 2 is in the above range, the physical properties required in the highly reflective panel can be effectively satisfied.

In one example, the polarizing plate satisfying Equation 1 or 2 above may exhibit a certain range of coordinates in the Lab color space of CIE (international commission on illumination).

The CIE Lab color space is a color space in which the CIE XYZ color space is nonlinearly transformed based on human visual antagonistic theory. In this color space, the L value represents brightness, where if the L value is 0, it represents black, and if the L value is 100, it represents white. Also, if the a value is a negative number, the color becomes a color slated to green and if it is a positive number, the color becomes a color slanted to red or violet. Furthermore, if the b value is a negative number, the color becomes a color slanted to blue and if the b value is a positive number, the color becomes a color slanted to yellow.

In one example, the polarizing plate may have characteristics obtained in the CIE Lab color space satisfying any one of the following conditions 1 to 4.

Condition 1: a −a value of 2 or less in CIE Lab color space:

Condition 2: a b value of 4 or less in CIE Lab color space:

Condition 3: a ratio (−b/a) of −a value and b value of 2.5 or less in CIE Lab color space:

Condition 4: a −bc value of 0.05 to 40 in CIE Lab color space.

In Condition 1, the −a value of the polarizing plate may be, for example, about 2 or less, less than 2, 1.8 or less, less than 1.8, 1.6 or less, or less than 1.6. The −a value may be about 0.7 or more, about 0.9 or more, about 1.1 or more, about 1.3 or more, or about 1.4 or more.

In Condition 2, the b value of the polarizing plate is a single color (bs) in Equations 1 and 2 above, which may be about 4 or less, about 3.5 or less, less than about 3.5, about 3 or less, less than about 3, about 2.5 or less, or less than 2.5 or so. The b value may be about 1.5 or more, more than about 1.5, about 2 or more, or more than about 2.5.

In Condition 3, the ratio of the −a value and the b value (−b/a, hereinafter may be referred to as C index) may be about 2.5 or less, or less than about 2.5. The C index may be about 1 or more, more than about 1, about 1.25 or more, more than about 1.25, about 1.5 or more, or more than about 1.5.

As Condition 4, the polarizer or polarizing plate may have a −bc value of 40 or less in the CIE Lab color space. In another example, the −bc value may be 38 or less, 36 or less, 34 or less, 32 or less, 30 or less, 28 or less, 26 or less, 24 or less, 22 or less, 20 or less, 18 or less, 16 or less, 14 or less, 12 or less, 10 or less, 8 or less, 6 or less, 4 or less, 2 or less, 1 or less, or 0.5 or less. In another example, the −bc value may be 0.01 or more, 0.05 or more, 0.1 or more, 0.5 or more, 1 or more, 2 or more, 4 or more, 6 or more, 8 or more, 10 or more, 12 or more, 14 or more, 16 or more, 18 or more, 20 or more, 22 or more, 24 or more, or 26 or more. The −bc value may be in the range by any one combination of any one of the upper limits and any one of the lower limits as described above. The polarizer has a light absorption axis formed in one direction. Here, the −bc value may be a value in which the b value in the CIE Lab color space, as measured using linearly polarized light polarized parallel to the light absorption axis, is multiplied by −1. That is, the a value and the b value in Conditions 1 to 3 may be the a value and the b value measured for un-polarized light. The bc value may be measured, for example, in the same manner as when measuring the b value, in a state where light absorption axes of two polarizers or polarizing plates are arranged to be vertical to each other.

The polarizer or polarizing plate may satisfy any one or two or more of Conditions 1 to 4 above, or all the above conditions. Such a polarizer or a polarizing plate can be applied to a liquid crystal panel, in particular, the above-mentioned highly reflective liquid crystal panel, to improve the disadvantages, for example, the visual sense in the black state while maintaining or maximizing the advantages of the liquid crystal panel. Although the reason is unclear, the polarizer having the optical characteristics as above can block or absorb light of a long wavelength, for example, red to yellow series light, in the light from the liquid crystal panel, thereby improving the visual sense characteristics in the black state.

In one example, the polarizer or polarizing plate may satisfy at least Condition 2 in Conditions 1 to 4 above and further satisfy Conditions 1 and/or 3. In another example, the polarizer or polarizing plate may satisfy at least Condition 3 above and further satisfy Conditions 1 and/or 2. Furthermore, in another example, the polarizer or polarizing plate may satisfy all Conditions 1 to 3 above. Also, in another example, the polarizer or polarizing plate may satisfy at least Condition 4 above and further satisfy at least one of Conditions 1 to 3.

For example, the polarizer or polarizing plate may satisfy at least Conditions 2 and 4 and further satisfy Conditions 1 and/or 3, or may satisfy at least Conditions 3 and 4 and further satisfy Conditions 1 and/or 2, or may satisfy all Conditions 1 to 4 above.

Each numerical value in the CIE Lab color space can be measured by applying a general method of measuring each coordinate of the color space, and for example, can be measured according to a manufacturer's manual after positioning an equipment with an integrating sphere type detector (spectrophotometer) (ex. CM-2600d, KONICA MINOLTA) at a measuring position. In one example, each coordinate of the CIE Lab color space may also be measured under a state where the polarizer or polarizing plate is attached to a liquid crystal panel, for example, a highly reflective liquid crystal panel, or may also be measured for the polarizer or polarizing plate itself.

The polarizing plate can satisfy other functions required for the polarizing plate while exhibiting the above-described optical characteristics.

For example, the polarizing plate may have a minimum transmittance (Tc) of about 0.01% or less, about 0.009% or less, about 0.006% or less, about 0.005% or less, about 0.004% or less, about 0.001% or less, or about 0.0009% or less. The minimum transmittance (Tc) may be about 0.0001% or more. In the present application, the term minimum transmittance (Tc) may mean the minimum value of transmittance appearing when having measured transmittances while scanning the overlapping state in which a light absorption axis of each polarizer forms angles in the range of 0 to 360 degrees for each angle under a state where two polarizing plates are overlapped. Here, at least one polarizing plate of the two overlapping polarizing plates may be a polarizing plate according to the present application, or a different polarizing plate, for example, a polarizing plate provided in the measuring equipment.

The polarizing plate may have a polarization degree of about 99.9% or more, or about 99.99% or more. The polarization degree in the present application is a numerical value calculated according to Equation A below.

$$\text{Polarization degree}(P)(\%) = \{(Tp-Tc)/(Tp+Tc)\}^{1/2} \times 100 \quad [\text{Equation A}]$$

In Equation A, Tp is the maximum transmittance of the polarizing plate, and Tc is the minimum transmittance as described above.

In Equation A, the maximum transmittance (Tp) may be a transmittance at a time showing the maximum value when having measured transmittances while scanning the overlapping state such that a light absorption axis of each polarizer forms angles in the range of 0 to 360 degrees for each angle under a state where two polarizing plates are overlapped. Here, at least one polarizing plate of the two overlapping polarizing plates may be a polarizing plate according to the present application, or a different polarizing plate, for example, a polarizing plate provided in the measuring equipment.

The above-mentioned transmittances (Ts, Tc, Tp) are values measured for light of about 550 nm.

The polarizing plate exhibiting such transmittance and polarization degree can be applied to a liquid crystal panel to exhibit excellent light transmission or blocking function.

The method for producing the polarizing plate as above is not particularly limited. For example, the polarizing plate, that is, a polarizing plate which may basically satisfy Equation 1 or 2 and optionally show coordinates in the above-described CIE Lab color space, can be produced by adjusting absorption rates of the polarizer included in the polarizing plate for each wavelength or by a method of adjusting other components included therein together with the polarizer. For example, the polarizer included in the polarizing plate or the polarizing plate may have a light-blocking rate in a range of about 5.1 to 6.0 for light having any one wavelength in a range of about 560 nm to about 750 nm, for example, light having a wavelength of about 700 nm. In another example, the polarizing plate or polarizer may have a light-blocking rate in the range of about 1 to 5 or 1.5 to 4.5 or 1.5 to 4, or 1.5 to 3.5 or 1.5 to 3 for light at a wavelength of 550 nm. Here, the light having any one wavelength in a range of about 560 nm to about 750 nm may be the linearly polarized light polarized at any one angle within a range of approximately −5 to 5 degrees, any one angle within a range of approximately −3 to 3 degrees with, or approximately parallel to a light absorption axis of the polarizer. Also, the light-blocking rate herein may mean, for example, absorbance.

The absorbance is calculated by an equation −log (Tc), where Tc may be the minimum transmittance as described above.

The method of performing so that the polarizer exhibits the above-described light-blocking rate is not particularly limited. The polarizing plate may comprise, for example, a PVA-based polarizer which is a typical absorptive polarizer. The PVA-based polarizer generally comprises a PVA film and an anisotropic absorbent material such as a dichroic pigment or iodine adsorbed and oriented on the PVA film, where the light-blocking rate can be adjusted through adjustment of the ratio or kind of the anisotropic absorbent material.

For example, the PVA-based polarizer may be produced by subjecting a PVA-based film to various treatments such as swelling, dyeing, cross-linking and stretching, followed by cleaning and drying processes, where the light-blocking rate may be controlled by adjusting process conditions in any one process of the above processes, or through additional processes. For example, the dyeing process can be performed by immersing the PVA-based film in a treatment tank containing iodine and potassium iodide, where the light-blocking rate can be adjusted through a process of adjusting concentrations of iodine and/or potassium iodide in the treatment tank, or further removing or supplementing at least one ingredient of the iodine and/or potassium iodide adsorbed after dyeing in this process. The method of adjusting the light-blocking rate is one example in which the polarizing plate of the present application can be produced.

It is also possible to prepare a polarizing plate or polarizer having the above-mentioned characteristics and/or light-blocking rate by adjusting concentrations of $I_2$, iodide and a boric acid compound (boric acid or borate) in the dyeing and cross-linking processes performed in the production process of the polarizer. That is, the polarizer is usually produced by dyeing and cross-linking a PVA (poly(vinyl alcohol)) film, where a swelling process is also performed before the dyeing process. In the above process, in order to dye a PVA film with iodine, a process of dyeing and cross-linking the PVA film with a dyeing solution or a cross-linking solution containing iodide such as iodine ($I_2$) and KI and/or a boric acid compound (boric acid or borate) is performed, where in the above process the concentration of the compound in the aqueous solution influences the color sense of the polarizer or polarizing plate.

For example, compound species of the iodine compounds that may be present in the dyeing solution and the cross-linking solution may include $I^-$, $I_2$, $I_3^-$, $I_5^-$ derived from iodide ($M^+I^-$) and iodine ($I_2$), and the like. However, among these compounds, $I^-$ has an absorption wavelength range of about 190 nm to 260 nm, the effect on the color sense of which is insignificant, $I_2$ has an absorption wavelength range of about 400 nm to 500 nm, the color sense of which is mainly red, $I_3^-$ has an absorption wavelength range of about 250 nm to 400 nm, the color sense of which is mainly yellow, and $I_5^-$ has an absorption wavelength range of about 500 nm to 900 nm, the color sense of which is mainly blue.

As described above, $I_2$, $I_3^-$ and $I_5^-$ mainly affect the color sense. However, among the iodine species, $I_3^-$ is generated in proportion to the concentration of iodide when iodide has been added in a relatively excess amount over iodine. In addition, the ratio of $I_5^-$ is in proportion to the concentration of the boric acid compound (boric acid or borate). Therefore, $I_3^-$ can be controlled by the concentration of iodide and $I_5^-$ can be controlled by the concentration of the boric acid compound.

As described above, a method of controlling concentrations of chemical species in a dyeing solution or a cross-linking solution is known.

Therefore, it is possible to produce a polarizing plate or polarizer having the above-mentioned characteristics and/or light-blocking rate by adjusting the concentrations of the chemical species in the dyeing solution or the cross-linking solution in a known manner in consideration of the absorption wavelength range and color sense of each chemical species.

For example, the polarizer or polarizing plate of orange or yellow series is produced by applying a dyeing solution or a cross-linking solution having relatively high concentrations of $I_2$ and/or $I_3^-$, and the polarizer or polarizing plate of blue series is produced by applying a relatively high concentration of the boric acid compound.

Also, the light-blocking rate can be adjusted in consideration of the absorption wavelength range of each chemical species, and the above-described characteristics, for example, the be value, and the like can also be adjusted by controlling a draw ratio, that is, orientation of iodine to be adsorbed.

The aforementioned dyeing solution and/or cross-linking solution in the dyeing and/or cross-linking processes is prepared by dissolving iodine ($I_2$) and iodide (KI etc.) or iodine ($I_2$), iodide (KI etc.) and a boric acid compound in a solvent (ex. water). In one example, a polarizing plate satisfying the requirements set forth in the present application may be produced by using a dyeing solution or cross-linking solution in which a weight ratio of the iodine and iodide (iodide/iodine) is controlled in the range of about 1 to 100 in consideration of the concentration of each chemical species, or by using a dyeing solution or cross-linking solution in which a weight ratio of the iodine and iodide (iodide/iodine) is in the range of about 1 to 100 and the concentration of the boric acid compound is controlled in the range of approximately 0.1 to 10 wt %. If necessary, a polarizing plate or polarizer satisfying the above conditions may be produced by adjusting the draw ratio together in the range to be described below.

As described above, the production of the polarizing plate or polarizer satisfying the requirements set forth in the present application is easy in a polarizing plate comprising a PVA series polarizer. Accordingly, the polarizing plate of the present application may comprise a polarizer comprising a PVA-based film and an anisotropic absorbent material adsorbed and oriented on the PVA-based film. Here, the anisotropic absorbent material may be iodine. That is, the polarizer may be an iodine- and PVA-based polarizer.

As the PVA-based film, for example, the conventionally used PVA-based film may be used. A material of such a PVA-based film may include PVA or a derivative thereof. The derivative of PVA may include polyvinylformal or polyvinyl acetal, and the like, and may also include those modified by olefins such as ethylene or propylene, unsaturated carboxylic acids such as acrylic acid, methacrylic acid or crotonic acid and alkyl esters thereof or acrylamide, and the like. The PVA has a polymerization degree of about 100 to 10000 or about 1000 to 10000, and a saponification degree of about 80 to 100 mol %, but is not limited thereto. As the PVA-based film, a hydrophilic polymer film such as a partially saponified film of ethylene-vinyl acetate copolymer series or a polyene-based alignment film such as a dehydrated product of PVA or a dehydrochlorinated product of polyvinyl chloride, and the like may also be exemplified.

The PVA-based film may contain an additive such as a plasticizer or a surfactant. The plasticizer may be exemplified by polyol and a condensate thereof, and for example, may be exemplified by glycerin, diglycerin, triglycerin, ethylene glycol, propylene glycol or polyethylene glycol, and the like. When such a plasticizer is used, the ratio thereof is not particularly limited and may be generally about 20 wt % or less in the PVA-based film.

The thickness of the PVA-based film is not particularly limited, and can be suitably selected within a range in which each of the above-described optical characteristics can be satisfied.

The kind of the anisotropic absorbent material that can be included in the polarizer is also not particularly limited. In the present application, among the known anisotropic absorbent materials, those capable of satisfying the above-described optical characteristics can be appropriately selected. An example of the anisotropic absorbent material can be exemplified by iodine. The ratio of the anisotropic absorbent material in the polarizing plate is also not particularly limited as long as it can satisfy the above-described optical characteristics, and those skilled in the art can easily set the range through simple experiment or prediction.

Such a polarizer can be produced, for example, by performing at least a dyeing process, a cross-linking process and a stretching process on the PVA-based film. In the dyeing process, the cross-linking process and the stretching process, the respective treatment tanks of a dyeing bath, a cross-linking bath and a stretching bath are used, respectively, and in these respective treatment tanks, a treatment solution according to each process can be used.

In the dyeing process, an anisotropic absorbent material such as iodine can be adsorbed and/or oriented on the PVA-based film. Such a dyeing process can be performed together with the stretching process. The dyeing can generally be carried out by immersing the film in a solution containing an anisotropic absorbent material, for example, an iodine solution. As the iodine solution, for example, an aqueous solution in which iodine ions are contained by iodine and an iodinated compound as a solubilizing agent may be used. As the iodinated compound, for example, potassium iodide, lithium iodide, sodium iodide, zinc iodide, aluminum iodide, lead iodide, copper iodide, barium iodide, calcium iodide, tin iodide or titanium iodide, and the like can be used. The concentrations of iodine and/or iodide ions in the iodine solution can be adjusted so as to achieve a light-blocking rate capable of satisfying the above-described optical characteristics. However, process parameters can be adjusted so that the light-blocking rate can be achieved even by an additional process other than the dyeing step, and in such a case, the concentration in the dyeing process may be applied in a usual range. In the dyeing step, the temperature of the iodine solution is usually 20 to 50° C. or 25 to 40° C. or so, and the immersion time is usually 10 to 300 seconds or 20 to 240 seconds or so, without being limited thereto. The light-blocking rate can also be controlled by adjusting the concentration of the iodine solution and/or the immersion time thereof.

The cross-linking process carried out in the production process of the polarizer can be carried out, for example, using a cross-linking agent such as a boron compound. The order of such a cross-linking process is not particularly limited, and the process can be performed, for example, with the dyeing and/or stretching processes, or can proceed separately. The cross-linking process may also be carried out several times. As the boron compound, boric acid or borax may be used. The boron compound can be generally used in the form of an aqueous solution or a mixed solution of water and an organic solvent, and usually an aqueous solution of boric acid is used. The boric acid concentration in the boric acid aqueous solution can be selected in an appropriate range in consideration of the cross-linking degree and the heat resistance thereof. An iodinated compound such as potassium iodide can be contained in an aqueous solution of boric acid or the like, and the above-described light-blocking rate can also be controlled through control of the concentration of such a compound.

The cross-linking process can be carried out by immersing the PVA-based film in an aqueous solution of boric acid, or the like, and in this process, the treatment temperature is usually in a range of 25° C. or higher, 30° C. to 85° C. or 30° C. to 60° C., and the treatment time is usually 5 seconds to 800 seconds or 8 seconds to 500 seconds or so, without being limited thereto.

The stretching process is generally performed by uniaxial stretching. Such stretching may also be performed together with the dyeing and/or cross-linking processes. The stretching method is not particularly limited, and for example, a wet stretching method can be applied. In such a wet stretching method, for example, stretching after dyeing is generally carried out, but stretching may be carried out together with cross-linking, and may be carried out several times or in multiple stages.

The iodinated compound such as potassium iodide can be contained in the treatment liquid applied to the wet stretching method and the light-blocking rate can also be controlled through control of the ratio in this process. In the stretching, the treatment temperature is usually in the range of 25° C. or higher, 30° C. to 85° C., or 50° C. to 70° C. or so, and the treatment time is usually 10 seconds to 800 seconds or 30 seconds to 500 seconds, without being limited thereto.

The total draw ratio in the stretching processes can be controlled in consideration of the orientation characteristics and the like, and the total draw ratio may be about 3 to 10 times, 4 to 8 times, or 5 to 7 times or so based on the original length of the PVA-based film, but is not limited thereto. Here, in the case of involving the stretching even in the swelling process or the like other than the stretching process, the total draw ratio may mean the cumulative draw ratio including the stretching in each process. Such a total draw ratio can be adjusted in consideration of orientation, workability or stretching cut possibility, and the like.

In addition to the dyeing, cross-linking and stretching, the swelling process may also be performed before the processes are performed. It is possible to clean contamination of the PVA-based film surface, or an antiblocking agent by swelling, and there is also an effect capable of reducing unevenness such as dyeing deviation by the swelling.

In the swelling process, water, distilled water or pure water, and the like can be usually used. The main component of the relevant treatment liquid is water, and if necessary, a small amount of an iodinated compound such as potassium iodide or an additive such as a surfactant, or alcohol, and the like can be included therein. In this process, it is also possible to adjust the light-blocking rate by controlling process variables.

The treatment temperature in the swelling process is usually 20° C. to 45° C. or so, or 20° C. to 40° C. or so, but is not limited thereto. Since the swelling deviations can cause dyeing deviations, the process variables can be adjusted so that the occurrence of such swelling deviations is suppressed as much as possible.

The proper stretching may also be performed in the swelling process. The draw ratio may be 6.5 times or less, 1.2 to 6.5 times, 2 times to 4 times, or 2 times to 3 times, based on the original length of the PVA-based film. The stretching in the swelling process can control the stretching in the stretching process performed after the swelling process to be small and can control so that the stretching failure of the film does not occur.

In the production process of the polarizer, a metal ion treatment can be performed. Such a treatment is carried out, for example, by immersing the PVA-based film in an aqueous solution containing a metal salt. This allows metal ions to be contained in the polarizer, and in this process, the color tone of the PVA-based polarizer can also be adjusted by controlling the kind or ratio of the metal ions. As the metal ion that can be applied, metal ions of transition metals such as cobalt, nickel, zinc, chromium, aluminum, copper, manganese or iron can be exemplified, and the color tone can also be adjusted by selecting a proper kind among them.

After the dyeing, cross-linking and stretching, a cleaning process may proceed. Such a cleaning process can be performed by a solution of an iodinated compound such as potassium iodide, and in this process, the above-described light-blocking rate can also be adjusted through the concentration of the iodinated compound in the solution or the treatment time of the cleaning process, and the like. Therefore, the concentration of the iodinated compound and the time of treatment into the solution can be adjusted in consideration of the light-blocking rate. However, the cleaning process may also be performed using water.

This cleaning with water may also be combined with cleaning with the solution of an iodinated compound, where a solution in which liquid alcohols such as methanol, ethanol, isopropyl alcohol, butanol or propanol are blended may also be used.

After passing through such a process, the polarizer can be produced by performing a drying process. In the drying process, for example, it may be carried out at an appropriate temperature for a suitable time in consideration of the required moisture content and the like, and such conditions are not particularly limited.

When the polarizing plate of the present application comprises a PVA-based polarizer, the desired polarizing plate can be obtained through control of the process variables in the respective processes. However, although the contents have been mainly explained through the polarizing plate comprising the PVA-based polarizer, the applicable polarizing plate is not limited to the polarizing plate, and other known polarizing plates can satisfy the above-described characteristics by adjusting the light-blocking rate and the like by a known method.

Other components that can be included in the polarizing plate of the present application can be exemplified by a protective film of a polarizing plate, a pressure-sensitive adhesive layer, an adhesive layer, a retardation film or a low-reflection layer, and the like. If necessary, the overall characteristics of the polarizing plate can be adjusted through control the other components, thereby improving suitability for applications in the present application. For example, the required level of physical properties can be adjusted so that they can be achieved by adjusting the overall light-blocking rate of the polarizing plate in such a manner that a specific pigment or dye is contained in the protective film, the pressure-sensitive adhesive layer, the adhesive layer, the retardation film and/or the low-reflection layer.

As the protective film that can be included in the polarizing plate, a film of a known material can be used. As such a material, for example, a thermoplastic resin having excellent transparency, mechanical strength, thermal stability, moisture barrier property or isotropy, and the like can be used. An example of such a resin can be exemplified by a cellulose resin such as triacetyl cellulose (TAC), a polyester resin, a polyethersulfone resin, a polysulfone resin, a polycarbonate resin, a polyamide resin, a polyimide resin, a polyolefin resin, a (meth)acrylic resin, a cyclic polyolefin resin such as a norbornene resin, a polyarylate resin, a polystyrene resin, a polyvinyl alcohol resin or a mixture thereof, and the like. For example, the protective film may be present on one side or both sides of a polarizing plate, and when present on both sides, each protective film may be the same or different. In addition to the protective film in film form, a cured resin layer obtained by curing a thermosetting or photo-curing resin such as (meth)acryl series, urethane series, acrylic urethane series, epoxy series or silicone series may also be applied as the protective film.

The thickness of the protective film can be appropriately adjusted, which can be usually adjusted within the range of 1 to 500 μm, 1 to 300 μm, 5 to 200 μm, or 5 to 150 μm from the viewpoints of workability such as strength or handleability, or thinning, and the like.

As the retardation film, a general material can be applied, and for example, a uniaxially or biaxially stretched birefringent polymer film or an alignment film of a liquid crystal polymer, and the like can be applied. Also, the thickness of the retardation film is not particularly limited.

The protective film or retardation film as described above may be attached to a polarizer or the like by an adhesive or the like, where an adhesion facilitating treatment such as corona treatment, plasma treatment, primer treatment or saponification treatment can be performed on such a protective film.

Furthermore, when a protective film is attached to a polarizer or the like, a hard coat layer, a low-reflection layer, an antireflection layer, a sticking prevention layer, a diffusion layer or a haze layer, and the like may be present on the side opposite to the side where the protective film is attached to the polarizer. The physical properties of the polarizer can also be adjusted through control of characteristics of such a layer.

In addition to the protective film or the retardation film, for example, various components such as a reflective plate or a semi-transmissive plate may also be present in the polarizing plate, and the kind thereof is not particularly limited.

An adhesive may be used for adhesion of a protective film or the like. The adhesive may be exemplified by an isocyanate adhesive, a polyvinyl alcohol adhesive, a gelatin adhesive, a vinyl-, latex- or water-based polyester, and the like can be exemplified, but is not limited thereto. As the adhesive, a water-based adhesive may be used, but depending on the type of the film to be attached, a solvent-free type photo-curable adhesive may also be used.

For attaching to other members such as a liquid crystal panel, a pressure-sensitive adhesive layer can be included in the polarizing plate. The pressure-sensitive adhesive for forming the pressure-sensitive adhesive layer is not particularly limited, and for example, an acrylic polymer, a silicone polymer, polyester, polyurethane, polyamide, polyether or a polymer such as a fluorine-based or rubber-based polymer can be appropriately selected and used. The adhesion of the pressure-sensitive adhesive layer to one side or both sides of the polarizing plate can be carried out in an appropriate manner, and the manner thereof is not particularly limited.

With respect to the exposed surface of the pressure-sensitive adhesive layer, a release film may be temporarily attached thereto and covered for the purpose of preventing the contamination until the layer is provided for practical use.

The polarizer, protective film or pressure-sensitive adhesive layer, and the like included in the polarizing plate may be provided with an ultraviolet absorbing ability. Such an ultraviolet absorbing ability can be realized by, for example, comprising an ultraviolet absorber in an appropriate proportion in each component. As the ultraviolet absorber, a salicylic ester-based compound, a benzophenol-based compound, a benzotriazole-based compound, a cyanoacrylate-based compound or a nickel complex salt-based compound, and the like may be used, without being limited thereto.

The present application also relates to a display device. The display device may comprise at least the polarizing plate. In one example, the display device may comprise a liquid crystal panel and the polarizing plate disposed on one side of the liquid crystal panel. At this time, the polarizing plate may be included as an upper polarizing plate, that is, a viewing side polarizing plate. Here, the liquid crystal panel may comprise an upper substrate and a lower substrate, and may comprise a liquid crystal layer between the upper substrate and the lower substrate. At this time, the liquid crystal panel may be a highly reflective liquid crystal panel, for example, a liquid crystal panel comprising no BM. Also, the liquid crystal panel may be a liquid crystal panel in which a TFT and a color filter are both present on the lower substrate side. In such a structure, the polarizing plate can improve the disadvantages, for example, the reflective visual sense characteristics in the black state while maintaining or maximizing the advantages of the liquid crystal panel. As described above, the liquid crystal panel is a transmissive liquid crystal panel, for example, a liquid crystal panel comprising no reflective plate.

In one example, the display device may comprise an additional polarizing plate (hereinafter, referred to as a second polarizing plate). For example, the above-described polarizing plate (hereinafter, referred to as a first polarizing plate) of the present invention may be disposed on the upper side of the liquid crystal panel, that is, the viewing side, and the second polarizing plate may be disposed on the lower side, that is, the back side or the light source side. In this case, the second polarizing plate may be, for example, one adjusted so that the light-blocking rate (light absorption rate or light reflectance) at any one wavelength within a range of 380 nm to 520 nm is 4 to 6 or so. Here, the light-blocking rate may be, for example, the same concept as the absorbance described above. The method of controlling the light-blocking rate of the second polarizer plate as above is not particularly limited, and a known method may be applied. In the case of applying the first polarizing plate of the present application as the upper polarizing plate of the above-described highly reflective liquid crystal panel, if the optical characteristics of the second polarizing plate are adjusted as above, the display characteristics in the black state and the white state can be greatly improved.

The specific structure of the highly reflective liquid crystal panel is not particularly limited. For example, the liquid crystal panel may have the same structure as that of a known liquid crystal panel except for comprising no BM. In this case, the color filter may also be present on any substrate side of the upper and lower substrates, and suitably, may be present on the lower substrate side. Also, the type of the liquid crystal layer included in the liquid crystal panel is not particularly limited, and for example, all known mode liquid crystal layers such as VA, IPS, TN or STN can be applied.

Advantageous Effects

In the present application, a polarizing plate can be provided, which can be applied to a display device comprising a highly reflective panel to solve disadvantages while maintaining advantages of the device. In the present application, a display device comprising the polarizing plate and the highly reflective panel can also be provided.

MODE FOR INVENTION

Hereinafter, the polarizing plate and the like will be described in more detail through examples and the like according to the present application, but the scope of the present application is not limited to the following.

Hereinafter, each physical property was measured in the following manner.

1. Measurement of Transmittance, Polarization Degree and Color Coordinate in CIE Lab In the following examples, the transmittance, polarization degree or CIE color coordinate, and the like were measured for the polarizing plate itself according to the manufacturer's manual using a JASCO V-7100 spectrophotometer. Furthermore, the transmittance and polarization degree were measured for light having a wavelength of 550 nm, and in Tables below, as and bs are values of a and b in the CIE Lab color space as measured for one polarizing plate, and ac and bc are values of a and b in the CIE Lab color space as measured in a state where two polarizing plates are overlapped so that their light absorption axes are perpendicular to each other.

2. Measurement of R1 (450), R2 (450), R1 (650) and R2 (650)

An equipment with an integrator type detector (spectrophotometer) (CM-2600d, KONICA MINOLTA) was positioned at a measuring position in a state where a polarizing plate was attached to a liquid crystal panel having a reflectance of about 23% for light having a wavelength of 550 nm (in the case of R1 (450) and R1 (650)) or a liquid crystal panel having a reflectance of about 15% for light having a wavelength of 550 nm (in the case of R2 (450) and R2 (650)), and R1 (450), R2 (450), R1 (650) and R2 (650) were measured according to the manufacturer's manual.

Production of Polarizer Sample

The polarizer sample was produced by performing the following swelling, dyeing, cross-linking, stretching and cleaning processes on a PVA film having an average polymerization degree of about 2,400 and a thickness of about 60 μm as a discotic film. The process variables in the above processes, for example, the concentration of iodine or iodine ions in the treatment liquid and the treatment time into the treatment liquid, were adjusted so that the characteristics as shown in Tables 1 to 4 below were implemented for each sample. The swelling was carried out by immersing the PVA film in a swelling bath for an appropriate time using pure water as the treatment liquid. In addition, the dyeing process was carried out by immersing the PVA film in a dyeing solution, in which the concentrations of iodine and potassium iodide were adjusted, at an appropriate temperature for a suitable time and in this process, the PVA film was stretched to an appropriate range. The cross-linking process was carried out by immersing the PVA film in an aqueous solution containing boric acid and potassium iodide in an appropriate ratio as the treatment liquid in the cross-linking bath and stretching the film to a predetermined range, and the stretching process was also carried out in a treatment liquid containing boric acid and potassium iodide in a predetermined concentration as the treatment liquid in the stretching bath. Subsequently, the cleaning process using an aqueous solution containing potassium iodide in a predetermined ratio as the treatment liquid in the cleansing bath and the drying process were passed through to produce a sample. The characteristics of each sample are as follows. In the above processes, the physical properties (numerical values in CIE Lab color coordinates or the like) of the polarizing plate can be controlled by adjusting the concentration of iodine or iodine ions in the treatment liquid and the draw ratio, and the like.

TABLE 1

|  | bs | R1 (450) (%) | R1 (650) (%) | K1 | Ts (%) | Tc (%) | P (%) |
| --- | --- | --- | --- | --- | --- | --- | --- |
| Sample 1 | 0.55 | 8.56 | 9.13 | 0.99 | 41.95 | 0.0085 | 99.9751 |
| Sample 2 | 1.95 | 8.23 | 9.32 | 0.98 | 42.41 | 0.0017 | 99.9832 |
| Sample 3 | 2.45 | 8.13 | 9.15 | 1.01 | 42.35 | 0.002 | 99.9903 |
| Sample 4 | 2.49 | 8.16 | 9.2 | 0.91 | 42.33 | 0.0027 | 99.991 |

K1: value calculated by Equation 1 (rounded to two decimal places)
Ts: single transmittance (based on a wavelength of 550 nm)
Tc: minimum transmittance (based on a wavelength of 550 nm)
P: polarization degree (based on a wavelength of 550 nm)

TABLE 2

|  | CIE-single | | | CIE-crossed | |
| --- | --- | --- | --- | --- | --- |
|  | −a | b | C index | a | b |
| Sample 1 | 0.57 | 0.55 | 0.96 | 15.1 | −27.6 |
| Sample 2 | 1.31 | 1.95 | 1.61 | 4.78 | −10.7 |
| Sample 3 | 1.56 | 2.45 | 1.44 | 2.78 | −6.22 |
| Sample 4 | 1.53 | 2.49 | 1.63 | 2.5 | −5.5 |

CIE-single: color space coordinate measured for one polarizing plate
CIE-crossed: color space coordinate measured in a state where light absorption axes of two polarizing plates are crossed at 90 degrees to each other

TABLE 3

|  | bs | R2 (450) (%) | R2 (650) (%) | K2 | Ts (%) | Tc (%) | P (%) |
| --- | --- | --- | --- | --- | --- | --- | --- |
| Sample 5 | 0.53 | 5.54 | 5.51 | 1.01 | 41.95 | 0.0085 | 99.9751 |
| Sample 6 | 2.26 | 5.49 | 5.63 | 1.01 | 42.09 | 0.0027 | 99.9919 |
| Sample 7 | 2.46 | 5.48 | 5.71 | 1 | 42.04 | 0.0017 | 99.9949 |
| Sample 8 | 3.44 | 5.11 | 5.75 | 1 | 42.08 | 0.0017 | 99.9979 |

K2: value calculated by Equation 2 (rounded to two decimal places)
Ts: single transmittance (based on a wavelength of 550 nm)
Tc: minimum transmittance (based on a wavelength of 550 nm)
P: polarization degree (based on a wavelength of 550 nm)

TABLE 4

|  | CIE-single | | | CIE-crossed | |
| --- | --- | --- | --- | --- | --- |
|  | −a | b | C index | a | b |
| Sample 5 | 0.55 | 0.53 | 0.96 | 15.22 | −27.4 |
| Sample 6 | 1.52 | 2.26 | 1.49 | 3.31 | −6.43 |
| Sample 7 | 1.57 | 2.46 | 1.57 | 1.87 | −3.91 |
| Sample 8 | 1.78 | 3.44 | 1.93 | 0.29 | −0.64 |

CIE-single: color space coordinate measured for one polarizing plate
CIE-crossed: color space coordinate measured in a state where light absorption axes of two polarizing plates are crossed at 90 degrees to each other Test Example The polarizing plate of each sample was attached on the upper substrate of the liquid crystal panel, in which both the color filter and the TFT were present on the lower substrate and thus the reflectance of the upper substrate side for light having a wavelength of 550 nm was about 12% or more, as a liquid crystal panel, and the visual sense in the black state was evaluated visually. As a result of the evaluation, when the polarizing plate of each sample was attached, the screen was recognized as black in the black state, whereby the visual sense in the black state was excellent. In addition, as a result of measuring the reflectance for light having a wavelength of about 650 nm on the attached side (upper substrate side) of the polarizing plate in the liquid crystal panel in each state, it can be confirmed that when the polarizing plates of Examples are attached, the reflectance is 9% or less all, and the reflective visual sense can be also improved.

The invention claimed is:

1. A polarizing plate applied to a display panel having a reflectance of 12% or more for light having a wavelength of 550 nm, wherein the polarizing plate has a K1 value calculated by Equation 1 below in a range of 0.9 to 1.1:

$$K1 = R1(450)/R1(650) + 0.044 \times \exp(0.43 \times bs) \quad \text{[Equation 1]}$$

wherein, bs is a single color of the polarizing plate, R1 (450) is a reflectance (unit:%) of the polarizing plate for light having a wavelength of 450 nm measured under a state where the polarizing plate is positioned on a reflective surface having a reflectance of 23% for light having a wavelength of 550 nm, and R1 (650) is a reflectance (unit:%) of the polarizing plate for light having a wavelength of 650 nm measured under a state where the polarizing plate is positioned on a reflective surface having a reflectance of 23% for light having a wavelength of 550 nm, and further satisfying at least one condition of the following conditions 1 to 4 and at least two conditions of Conditions 1 to 3:

Condition 1: a −a value of 2 or less in CIE Lab color space;
Condition 2: a b value of 4 or less in CIE Lab color space;
Condition 3: a ratio (−b/a) of −a value and b value of 2.5 or less in CIE Lab color space;
Condition 4: a −bc value of 0.05 to 40 in CIE Lab color space; and
wherein the polarizing plate has a polarizer comprising a PVA-based film and an anisotropic absorbent material adsorbed and oriented on the PVA-based film.

2. The polarizing plate according to claim 1, wherein the polarizing plate has a single transmittance (Ts) in a range of 40% to 45%.

3. The polarizing plate according to claim 1, satisfying Condition 2 and further satisfying Condition 1 or 3.

4. The polarizing plate according to claim 1, satisfying Condition 3 and further satisfying Condition 1 or 2.

5. The polarizing plate according to claim 1, satisfying all Conditions 1 to 3.

6. The polarizing plate according to claim 1, wherein the polarizing plate has a light absorption axis formed in one direction and a transmittance (Tc) of 0.01% or less for linearly polarized light forming an angle in a range of −5 degrees to 5 degrees with the light absorption axis.

7. The polarizing plate according to claim 1, wherein the polarizing plate has a polarization degree of 99.9% or more.

8. The polarizing plate according to claim 1, wherein the polarizing plate has a light-blocking rate in a range of 5.1 to 6.0 for light having any one wavelength in a range of 560 nm to 750 nm.

9. The polarizing plate according to claim 1, further comprising a polarizer protective film, a pressure-sensitive adhesive layer, an adhesive layer, a retardation film or a low-reflection layer.

10. A display device comprising the polarizing plate of claim 1.

11. The display device according to claim 10, further comprising a liquid crystal panel having a reflectance of 12% or more for light having a wavelength of 550 nm, wherein the polarizing plate is disposed on the viewing side of the liquid crystal panel.

12. The display device according to claim 11, further comprising a second polarizing plate disposed on the back side of the liquid crystal panel.

13. The display device according to claim 12, wherein the second polarizing plate has a light-blocking rate in a range of 4 to 6 at any one wavelength in a range of 380 nm to 520 nm.

14. A polarizing plate applied to a display panel having a reflectance of 12% or more for light having a wavelength of 550 nm, wherein the polarizing plate has a K2 value calculated by Equation 2 below in a range of 0.9 to 1.1:

$$K2 = R2(450)/R2(650) + 0.0026 \times \exp(1.09 \times bs) \qquad \text{[Equation 2]}$$

wherein, bs is a single color of the polarizing plate, R2 (450) is a reflectance (unit:%) of the polarizing plate for light having a wavelength of 450 nm measured under a state where the polarizing plate is positioned on a reflective surface having a reflectance of 15% for light having a wavelength of 550 nm, and R2 (650) is a reflectance (unit:%) of the polarizing plate for light having a wavelength of 650 nm measured under a state where the polarizing plate is positioned on a reflective surface having a reflectance of 15% for light having a wavelength of 550 nm, and further satisfying at least one condition of the following conditions 1 to 4 and at least two conditions of Conditions 1 to 3:
Condition 1: a −a value of 2 or less in CIE Lab color space;
Condition 2: a b value of 4 or less in CIE Lab color space;
Condition 3: a ratio (−b/a) of −a value and b value of 2.5 or less in CIE Lab color space;
Condition 4: a −bc value of 0.05 to 40 in CIE Lab color space; and
wherein the polarizing plate has a polarizer comprising a PVA-based film and an anisotropic absorbent material adsorbed and oriented on the PVA-based film.

15. A polarizing plate applied to a viewing side of a liquid crystal panel having a reflectance of 12% or more for light having a wavelength of 550 nm, wherein the polarizing plate has a K1 value calculated by Equation 1 below in a range of 0.9 to 1.1:

$$K1 = R1(450)/R1(650) + 0.044 \times \exp(0.43 \times bs) \qquad \text{[Equation 1]}$$

wherein, bs is a single color of the polarizing plate, R1 (450) is a reflectance (unit: %) of the polarizing plate for light having a wavelength of 450 nm measured under a state where the polarizing plate is positioned on a reflective surface having a reflectance of 23% for light having a wavelength of 550 nm, and R1 (650) is a reflectance (unit:%) of the polarizing plate for light having a wavelength of 650 nm measured under a state where the polarizing plate is positioned on a reflective surface having a reflectance of 23% for light having a wavelength of 550 nm, and further satisfying at least one condition of the following conditions 1 to 4 and at least two conditions of Conditions 1 to 3:
Condition 1: a −a value of 2 or less in CIE Lab color space;
Condition 2: a b value of 4 or less in CIE Lab color space;
Condition 3: a ratio (−b/a) of −a value and b value of 2.5 or less in CIE Lab color space;
Condition 4: a −bc value of 0.05 to 40 in CIE Lab color space; and
wherein the polarizing plate has a polarizer comprising a PVA-based film and an anisotropic absorbent material adsorbed and oriented on the PVA-based film.

* * * * *